UNITED STATES PATENT OFFICE.

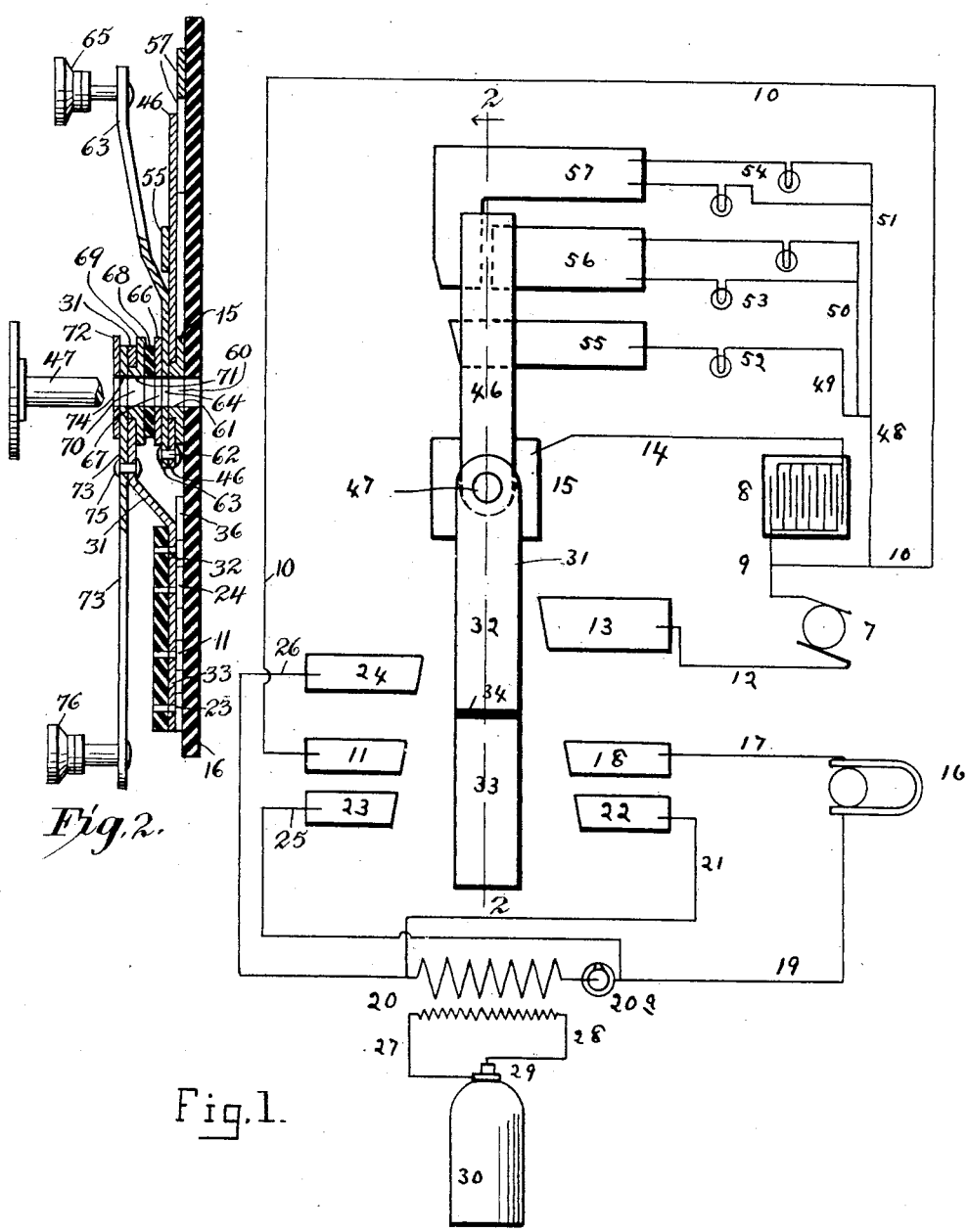

MONTGOMERY H. JOHNSON, OF UTICA, NEW YORK.

SYSTEM OF ELECTRICAL DISTRIBUTION.

1,180,044.  Specification of Letters Patent.  Patented Apr. 18, 1916.

Original application filed December 26, 1911, Serial No. 667,661. Divided and this application filed May 13, 1912. Serial No. 696,871.

*To all whom it may concern:*

Be it known that I, MONTGOMERY H. JOHNSON, of Utica, in the county of Oneida and State of New York, have invented certain new and useful Improvements in Systems of Electrical Distribution; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to the system of electrical distribution used in connection with internal combustion engines.

The subject matter of this application was formerly a part of an application filed by me in the United States Patent Office December 26, 1911, Serial No. 667,661.

The purpose of this invention is to provide a new and improved system of electrical distribution.

A further purpose is to provide such a system where one means gives control over the lighting circuit or circuits and the engine ignition circuit or circuits; and a further object is such a system wherein one means affords control over the battery charging circuit, the lighting circuit or circuits and the engine ignition circuit or circuits.

Further advantages and purposes of my invention will be evident from the description thereof hereinafter and the claims forming a part of this application.

Figure 1 is a diagrammatic view of a system embodying my invention as applied to an equipment having an electric lighting circuit or circuits, a battery charging circuit, and ignition circuit or circuits with a single means of control over said circuits. Fig. 2 is a sectional view on line 2—2 of Fig. 1 as that form of my device is equipped with one form of a proper controlling means.

Referring to the drawings in a more particular description and first to the arrangement shown in Fig. 1, one terminal of direct current dynamo 7 and one terminal of storage battery 8 are connected by lead 9 and thereby jointly through lead 10 to a terminal 11. The other terminal of the dynamo is connected by lead 12 to a terminal 13. The other terminal of the battery 8 is connected by lead 14 to a plate 15. One terminal of the magneto 16 is connected by lead 17 to a terminal 18 while the other terminal of the magneto is connected through lead 19 and the primary coil of transformer 20 and lead 21 to a terminal 22. Terminal plates 23 and 24 of the battery ignition circuit are connected to opposite ends of the primary coil of the transformer 20 by leads 25 and 26 respectively. The secondary coil of the transformer is connected by leads 27 and 28 to the spark plug 29 of the internal combustion engine 30. About a movable member 31 having its two parts 32 and 33 insulated from each other by insulation 34 are arranged the terminal plates 15, 13, 18, 22, 24, 11 and 23 as by having the part 32 over but not in contact with plate 15 and plate 13 to the right of part 32 and plate 24 to the left of part 32, and plates 18 and 22 to the right of part 33 and plates 11 and 23 to the left of part 33, so that in a middle position none of said terminal plates are connected by member 31 or either of its parts but by a movement of said member 31, as to the right, plate 15 will be connected to terminal plate 13 by part 32 and at the same time terminals 18 and 22 of the magneto ignition circuit will be connected by part 33 while a movement of member 31 in another direction as to the left to middle position will disconnect all said terminals and by further movement as to the left will cause part 32 to connect terminal plates 15 and 24 and part 33 will connect terminal plates 11 and 23. It will now be evident upon moving the member 31 from a middle or neutral position to a position where the part 32 will connect the terminals 15 and 24 and the part 33 will connect the terminals 11 and 23 that the member 31 and its two parts act to close both breaks in the battery ignition circuit and thereby the battery ignition circuit becomes operative to produce the necessary sparks for the engine 30. This ignition circuit is broken again in both places by a single movement of the member 31 from the terminals 24, 11 and 23 and by further movement of member 31, as to the right, the part 32 connects terminals 15 and 13 and at the same time the part 33 connects terminals 18 and 22. It will be seen that the connection made by part 33 from terminal 18 to terminal 22 closes the magneto ignition circuit which is the ignition circuit normally used by the engine after it has once been started. It will be evident that the same movement that rendered operative the magneto ignition circuit also closes the circuit between terminal 15 and terminal 13 by means of part 32 and thereby closes the battery charging circuit which consists of the dynamo 7, lead 12, terminal 13, part 32, terminal 15, lead 14, battery 8 and lead 9. By this arrangement of parts by the single movement of making the magneto ignition circuit operative I also complete the battery charging circuit so that the battery may be charged again in readiness for its being used as battery ignition or for any other purpose desired. The engine will usually be stopped by breaking the magneto ignition circuit which is done by withdrawing part 33 from its connecting position relative to terminals 18 and 22. The same movement, however, has also moved part 32 from its connecting position relative to terminals 13 and 15 and thereby breaks the circuit connecting the dynamo and battery and thereby prevents the battery from discharging into the dynamo which has ceased to be a generator of electricity through the stopping of the engine with which it is preferably operatively connected.

One or more electric lighting circuits are provided having a movable means 46 adapted to make operative any desired group or groups of lights and controlled by suitable means 47. From the lead 10 which is directly connected to lead 9 which in turn is connected to the battery 8 extends a lead 48 from which may be taken leads 49, 50 and 51 to form parts of different lighting circuits 52, 53 and 54 respectively having their respective terminals 55, 56 and 57 so arranged relative to movable member 46 as to enable the operator to make the desired combination of lights. The movable member 46 may be in constant contact with terminals 15 so that movement of member 46 will close such lighting circuits as are desired in an obvious manner.

In this system while the movable means 46 and the movable member 31 are movable independently of each other they are both controlled or rendered operative by a single controlling means 47. I do not mean to limit myself in this application to any particular means for accomplishing this function but show in Fig. 2 a sectional view of a switch that may be used with the combination of circuits shown in Fig. 1 to obtain a single controlling means thereover. This switch *per se* forms the subject matter of another application and I will therefore describe it here only sufficiently to illustrate one form of a single means of control for the combination of circuits dealt with in this application. Secured upon a base 16 is the inner conducting pivoting plate 15. This plate has a round hole 60 therethrough adapted to receive the controlling means or plug 47 and around the hole is an annular flange 61 upon which is pivoted the movable contact member or arm 46 to which a little below the flange 61 is pivoted by pin 62 the lower end of the lighting switch lever 63. The contact arm 46 extends upward far enough to be swung into contact with the different contact plates 55, 56 and 57 of various lighting circuits. The lighting switch lever 63 extends upwardly from its pivoted connection with the contact arm 46 over the hole 60 in the conducting plate 15 at which point there is provided a similar round hole 64 adapted to receive the plug 47 and to be in line with the hole 60 when the lever 63 is in alinement with the contact arm 46. The upper end of the lighting lever 63 is provided with a handle 65. A strap or bridge 66 is provided to keep the lever 63 and contact arm 46 in position while a round hole 67 in the bridge 66 in line with the hole 60 in the conducting plate 15 admits the plug 47 and holds it against side movement. The plug 47 has its body of conductive material and is perfectly circular in cross section to afford ample electrical contact to the parts through which it extends and to afford easy contact for the parts fitted thereon.

The mechanical operation of the switch thus far described will be as follows: When the plug 47 is not in place movement of the lever 63 by its handle 65 will simply move the lever from side to side with the pin 62 as its pivoting point, but will be inoperative to move the contact arm 46 as the lever 63 and arm 46 though side by side have only one fastening point common to both and that is the loose-pivoting fastening. It will be understood of course that the contact arm 46 has sufficient friction against the contact plates 55, 56 and 57 to prevent the friction of the adjacent lever 63 from moving the contact arm 46. It will be obvious therefore that unless the plug 47 is in place movement of the lever 63 will be inoperative to move the contact arm 46 from its former position. When the plug is inserted in the switch it will be seen that the plug will act as a lock holding the lever 63 and contact arm 46 in line at another or second point and so locking the contact arm to the lever and causing them to swing together around the plug 47 as a pivot and thereby causing the upper end of the contact arm 46 to move in the same direction and to the extent that the lever 63 is moved. Superimposed directly over the conducting pivoting plate 15 and its connected parts and the bridge 66 but not in electrical contact therewith and being insulated therefrom by a suitable insulation block 68 is an upper conducting pivoting plate 69. Through the conducting plate 69 is a round hole 70 in alinement with the plug holes in the other conducting plate 15 and adapted likewise to receive the plug 47. Surrounding the hole 70 in the conducting plate 69 is an annular flange 71 about which is pivoted the swinging contact arm or member 31 between which and the bridge 72 secured to plate 69 is the lever 73 for this switch having plug hole 74 therein. A little distance down from the plug holes the lever 73 and the contact arm 31 are loosely pivoted to each other by pin 75. The lever 31 extends downwardly a suitable distance and is provided with a handle 76. Below the pivoting pin 75 the contact arm 31 is bent toward the base 16 and then extends downwardly parallel thereto in order to have its part 32 make contact with contact plates 13 or 24 and its part 33 with contact plates 18 and 22 or 11 and 23. As already described with regard to the other part of this switch it will be obvious that the contact arm 31 of this switch will be mechanically inoperative upon movement of the switch lever 73 except when the plug 47 is in place.

It will be noted that I have made a construction wherein a single member serves to mechanically lock into operative connection a series of two or more switches either of which may be operated independently of each other and yet the withdrawal of said one controlling member will render both inoperative for the reason that the one controlling member or plug is the common pivot of both switches in each of which the lever and contact arm are pivotally connected to each other at a point other than their pivoting point during operative connection.

It will now be seen that I have shown an electrically ignited internal combustion engine wherein a single means controls the battery charging circuit, the ignition circuit or circuits and the lighting circuit or circuits. For instance the engine may be started with the battery ignition circuit and the different lighting circuits be turned on, independently either before or after; and that the ignition may then be changed to magneto ignition without interruption of the lighting circuits; that upon the magneto ignition circuit being made operative the battery charging circuit is also closed thereby replenishing the battery of the lighting system and that upon stopping the engine by opening the magneto ignition circuit the battery charging circuit is also opened to prevent the battery discharging through the dynamo; that the lighting circuits may be controlled as desired without regard to whether the ignition circuits or battery charging circuits are closed or open.

What I claim as new and desire to secure by Letters Patent is:

1. The combination of a plurality of translation circuits, independently movable switches therefor and one member common to all said switches and necessary for their mechanical manipulation and forming a part of one of said circuits and whose removal makes said switches mechanically unchangeable and breaks the circuit of which it is a part.

2. The combination of a plurality of translation circuits, independently movable switches therefor and one member common to all said switches and necessary for their mechanical manipulation and forming a part of less than all of said circuits and whose removal makes said switches mechanically unchangeable and breaks the circuits of which it is a part.

3. The combination of a plurality of translation circuits, switches therefor and one member common to all said switches and necessary for their manipulation and forming a part of some of said circuits and whose removal makes said switches mechanically unchangeable and breaks the circuit or circuits of which it is a part.

In witness whereof I have affixed my signature, in the presence of two witnesses, this 8th day of May, 1912.

MONTGOMERY H. JOHNSON.

Witnesses:
ETHEL BUTTERWORTH,
HARRIET WILLIAMS.

Copies of this patent may be obtained for five cents each, by addressing the "Commissioner of Patents, Washington, D. C."